US010759404B2

(12) United States Patent
Leiber et al.

(10) Patent No.: US 10,759,404 B2
(45) Date of Patent: Sep. 1, 2020

(54) ACTUATION SYSTEM, IN PARTICULAR FOR A VEHICLE BRAKE, AND METHOD FOR OPERATING THE ACTUATION SYSTEM

(71) Applicant: IPGATE AG, Pfäffikon Sz (CH)

(72) Inventors: Thomas Leiber, München (DE); Anton Van Zanten, Ditzingen (DE); Christian Köglsperger, Geretsried (DE); Valentin Unterfrauner, München (DE); Heinz Leiber, Oberriexingen (DE)

(73) Assignee: IPGATE AG, Pfaffikon (CH)

( * ) Notice: Subject to any disclaimer, the term of this patent is extended or adjusted under 35 U.S.C. 154(b) by 140 days.

(21) Appl. No.: 15/503,554

(22) PCT Filed: Aug. 13, 2015

(86) PCT No.: PCT/EP2015/068696
§ 371 (c)(1),
(2) Date: Apr. 6, 2017

(87) PCT Pub. No.: WO2016/023995
PCT Pub. Date: Feb. 18, 2016

(65) Prior Publication Data
US 2017/0232948 A1 Aug. 17, 2017

(30) Foreign Application Priority Data
Aug. 13, 2014 (DE) .................. 10 2014 111 594

(51) Int. Cl.
B60T 8/40 (2006.01)
B60T 13/74 (2006.01)
(Continued)

(52) U.S. Cl.
CPC .............. B60T 8/409 (2013.01); B60T 8/348 (2013.01); B60T 8/4081 (2013.01);
(Continued)

(58) Field of Classification Search
CPC .......... B60T 8/348; B60T 8/341; B60T 8/409; B60T 8/4077; B60T 8/441; B60T 8/686;
(Continued)

(56) References Cited

U.S. PATENT DOCUMENTS

2008/0257670 A1* 10/2008 Drumm ................. B60T 8/4077
188/358
2011/0241419 A1* 10/2011 Ohkubo .................... B60T 1/10
303/9.62
(Continued)

FOREIGN PATENT DOCUMENTS

DE 102006030141 A1 1/2008
DE 102010023865 A1 12/2011
(Continued)

OTHER PUBLICATIONS

Int'l Preliminary Report on Patentability dated Feb. 14, 2017 in Int'l Application No. PCT/EP2015/068696.

Primary Examiner — Robert A. Siconolfi
Assistant Examiner — San M Aung
(74) Attorney, Agent, or Firm — Panitch Schwarze Belisario & Nadel LLP

(57) ABSTRACT

An actuation system, in particular for a vehicle brake, may include an actuating device, such as a brake pedal, at least one first pressure source, e.g., a piston-cylinder unit (master cylinder), which can be actuated in particular by means of the actuating device and a second pressure source, in particular a piston-cylinder unit, with an electro-mechanical drive. The pressure sources may each be connected to at least one brake circuit via a hydraulic line, in order to supply the brake circuit with pressurising medium and to pressurise the vehicle brake. There may further be a valve device for regulating the brake pressure. It is planned that during forward and return stroke at least one brake circuit can be
(Continued)

fed controlled pressurising medium by way of the second pressure source.

26 Claims, 5 Drawing Sheets

(51) Int. Cl.
*B60T 13/14* (2006.01)
*B60T 8/34* (2006.01)
*B60T 13/68* (2006.01)

(52) U.S. Cl.
CPC .......... *B60T 13/146* (2013.01); *B60T 13/686* (2013.01); *B60T 13/745* (2013.01); *B60T 2270/403* (2013.01)

(58) Field of Classification Search
CPC .... B60T 8/4031; B60T 8/4045; B60T 8/4059; B60T 8/4072; B60T 8/4081; B60T 13/662; B60T 13/141; B60T 13/146; B60T 17/02; B60T 2270/403
USPC ............... 303/10, 11; 60/327, 553, 545, 585
See application file for complete search history.

(56) References Cited

U.S. PATENT DOCUMENTS

| | | | | |
|---|---|---|---|---|
| 2012/0090315 A1* | 4/2012 | Anderson | ............... | B60T 7/042 60/545 |
| 2013/0207452 A1* | 8/2013 | Gilles | ................... | B60T 8/4018 303/9.75 |
| 2013/0213025 A1* | 8/2013 | Linden | .................. | B60T 8/4018 60/327 |
| 2014/0333124 A1* | 11/2014 | Koo | ........................ | B60T 7/042 303/10 |

FOREIGN PATENT DOCUMENTS

| | | |
|---|---|---|
| DE | 102011080312 A1 | 2/2012 |
| DE | 102010045617 A1 | 3/2012 |
| DE | 102012222897 A1 | 8/2013 |
| WO | 2011157347 A1 | 12/2011 |
| WO | 2012017037 A2 | 2/2012 |

* cited by examiner ated by the motor spindle and ineffective in the fall-back level, allowing the predetermined deceleration. Under certain circumstances, the correspondingly high forces could negatively affect the spindle, ball screw drive (KGT) and the bearings.

ACTUATION SYSTEM, IN PARTICULAR FOR A VEHICLE BRAKE, AND METHOD FOR OPERATING THE ACTUATION SYSTEM

CROSS-REFERENCE TO RELATED APPLICATIONS

This application is a Section 371 of International Application No. PCT/EP2015/068696, filed Aug. 13, 2015, which was published in the German language on Feb. 18, 2016 under International Publication No. WO 2016/023995 A1, which claims priority to German Patent Application No. 10 2014 111 594.5, filed Aug. 13, 2014, the disclosures of which are incorporated herein by reference.

The invention relates to an actuation system, in particular for a vehicle brake and to a method for operating the actuation system.

BACKGROUND

The demands on braking systems are increasing. This applies in particular to reliability and good fall-back level. If the brake booster fails, an internationally specified foot force of 500 N should achieve a delay of more than 0.64 g, which is significantly greater than the minimum legislated requirement of 0.24. An advantage of the high achievable deceleration is that, if the brake booster fails, a red warning lamp that irritates the driver does not need to be triggered.

These requirements can be solved by means of brake-by-wire systems with a path simulator. Here, the master cylinder (Hz) or tandem master cylinder (THZ) is designed for the fall-back level in case of a braking system failure. This is achieved through appropriate dimensioning with a small diameter. This creates higher pressures at a corresponding foot force. The required brake fluid volume for 0.64 g and corresponding pressure is relatively small compared to that at maximum pressure at full vehicle deceleration and fading. A THZ cannot fully raise the necessary volume, even with a larger stroke. The applicant's document DE 10 2009 043 494 proposes a solution for this involving a storage chamber that, at higher pressures, feeds corresponding volumes into the brake circuit. A further solution is described in the applicant's document DE 10 2010 045 617 A1, in which volumes from the master cylinder are delivered from the reservoir into the brake circuit via the corresponding valve and THZ control. In the case of vehicles with large volume intakes, e.g. SUVs and vans, brake circuits must be filled up during deceleration even before the blocking pressure for high μ. Both solutions place high demands on the tightness of the valves.

Furthermore, interruption of pressure build-up and small brake losses are related to the additional filling of the brake circuits.

The applicant's document DE 10 2011 111 369 describes a system with an additional piston, which achieves the required pressure fluid volume and has the advantage of being actuated by the motor spindle and ineffective in the fall-back level, allowing the predetermined deceleration. Under certain circumstances, the correspondingly high forces could negatively affect the spindle, ball screw drive (KGT) and the bearings.

Another important aspect is the installation length. There are two different types of braking systems, "serial design" S and "parallel design" P (also referred to as "S-system" or "P-system"). This means that, in the case of the S-system, the main components (e.g. in DE 10 2011 111 369) of the master cylinder THZ, motor with the ball screw drive KGT and the auxiliary pistons are arranged in one axle, and in the P-system (e.g. in DE 10 2012 222 897 A1), the master cylinder THZ is arranged in one axle, while a piston cylinder unit (plunger) for volume supply is arranged in a laterally offset second axle with a motor.

P-systems require less installation length, but are more complex and differ from the S-system in reliability.

According to the applicant's document DE 10 2013 111 974.3, a P-system with double-stroke piston and THZ is achieved with an installation length and valve circuit that does not yet meet all requirements.

A brake system for motor vehicles in which a driven double-stroke piston is used to build up brake pressure in the wheel brakes is known from WO 2012/017037 and WO 2011/157347. The common feature of both applications is that the delivery volume is fed to the brake circuits via a single-circuit connection line from the double-stroke piston via feed valves. However, an alternative separate supply to the brake circuits via feed valves includes a connecting valve that merges the brake circuits. Both solutions are error-prone because, in the event of failure of the brake circuit and feed valves, failure of braking force amplification or total brake failure follows. DE 2006 030 141 also plans for a single-circuit connection line, which is connected to loads via changeover valves. These valves have an additional connection to the reservoir. The single-circuit connection with changeover valves is also error-prone here when safety-relevant loads are used, e.g. brake or transmission systems.

OBJECT OF THE INVENTION

The invention is based on the object of creating a system with low structural complexity, short installation length and high reliability.

Solution to the Problem

The solution according to various embodiments of the invention may be achieved by the features of the various attached claims.

The solution according to the invention and its configurations create an actuation system with short installation length and high reliability, which is further reduced in complexity and, in an advantageous embodiment, manages with as little complexity as possible, regarding valves in particular, and facilitates incremental expansion stages.

Advantageous embodiments or designs of the invention are included in the further claims, which are also referred to herein for description purposes for the sake of simplicity.

The invention is based on the applicant's document DE 10 2014 109 628.8 (which is also referred to in this respect for purposes of disclosure), wherein, in addition to doing without the separating valves TV, it does not require some further valves (valves EA). In addition to cost savings, this results in increased reliability since the two pressure chambers of the double-stroke piston DHK are each separately connected to a brake circuit. This provides a 2-circuit pressure supply to the 2-circuit brake system, which allows increased reliability and error transparency.

With the solution according to the invention and its embodiments, the potential of a double-stroke piston with different active surfaces is implemented by pre-filling, in particular at low pressure (<50 bar). A connection between the pressure chambers of the double-stroke piston, which can be interrupted by means of a valve, is planned for this purpose. Using the double-stroke piston with different active surfaces can affect the larger active surface in a first stroke range at lower pressures when the connection to the pressure chambers of the double-stroke piston is closed. Afterwards, when the valve is open, the connection in the forward stroke produces a smaller active surface (difference between the two active surfaces). This requires smaller piston forces, which is an advantage at higher pressures because of the lower spindle force and the lower motor torque.

On this basis, the functions can now be expanded through corresponding additional valves. In FIG. 7 of DE 10 2014 109 628.8, the brake circuit pre-filling is described by means of a pressure relief valve with a fixed setting. This can be improved by a solenoid valve, which allows variable pre-filling and also allows the volume of the return stroke to be fed into the brake circuit HL2. For safety reasons, the valve's closing spring is set at the blocking pressure, e.g. 200 bar, so that if brake circuit BHL2 fails, a pre-filling valve prevents delivery into this circuit.

Pressure reduction takes place in both brake circuits via the opening of the outlet valves, and is measured by the pressure sensor.

If this is not desired, pressure reduction can be carried out via a further valve by the double-stroke piston (DHK), if only the forward stroke is used for pressure build-up, e.g. up to 200 bar. This valve allows multiplex mode, in which both pressure build-up and reduction take place via the double-stroke piston (DHK). In a serial system, the double-stroke piston (DHK) replaces the pressure rod piston of the first piston-cylinder unit.

In a further version, pressure reduction can also occur during the return stroke through the double-stroke piston (DHK) via an additional valve for the return stroke.

Furthermore, a position sensor for the first piston-cylinder unit (floating piston SK) is planned, which allows the floating piston to be positioned by means of a corresponding return stroke circuit that feeds a larger volume into the brake circuit HL1 for the fall-back level, e.g. in the event of a motor failure.

Diagnosing the various functions, e.g. the auxiliary piston circuit, is very important. Pressure from the double-stroke piston (DHK) is feed into this circuit for this purpose. The circuit must be closed for this. However, when the circuit is closed, pressure compensation is necessary when the vehicle is parked and temperatures are rising. Either a suction-valve-throttle combination is planned for this purpose, or, in the case of auxiliary pistons with an expansion port, a flow control valve that closes when the auxiliary piston is pressurised.

There is a great potential for simplification in the set-up of the path simulator. A corresponding dimensioning of the pedal tappet, which counteracts the pedal force with the pressure reaction, is available for this purpose. This eliminates the need for a path simulator piston with valves. In normal operation, the auxiliary piston circuit is pressureless. A certain throttling effect during braking can result from operating the WA valve with pulse width modulation (PWM). This embodiment also allows an adaptive characteristic curve, as will be described later.

In the case of the serial system, the piston diameter of the first piston-cylinder unit (master cylinder) is provided by the volume and maximum pedal force according to the regulations. Conversely, the parallel system with double-stroke piston (DHK) has a large margin for the piston diameter, stroke, spindle force and motor torque. Additionally, the volume fed to the braking system from a piston stroke can be significantly improved by pre-filling.

According to the prior art, the volume balance of the braking system is determined by the stroke of the delivery piston (master cylinder or plunger).

The volume intake of a vehicle essentially depends on the elasticity of the brake calliper, pressure and vehicle weight. From small cars to SUVs, almost factor 2.

Additional delivery with the return movement of the pistons produces additional volumes in some systems, but this is associated with a considerable time loss of 100-200 ms.

In the double stroke piston (DHK), two piston diameters=surfaces are available as stepped pistons, and simultaneously offer a rapid changeover from forward stroke to return stroke without a significant time interruption. The piston strokes can thus be designed smaller or the piston surfaces, which determine the spindle force and the motor torque proportionally to the pressure. This means that compared to the serial system, spindle forces can be reduced by up to 50%, which in turn allows for a smaller gear unit (ball screw drive KGT) or a cost-effective plastic nut for the gear unit. As already mentioned, the volume delivery/stroke can be considerably improved when pre-filling with the large surface. As is known, a motor at the same power can be optimised by means of a higher rotational speed with correspondingly smaller torque. This essentially determines the frame size and weight. This can be used with the double-stroke piston (DHK) through smaller piston diameters=smaller spindle force=motor torque with larger stroke. This is ideally optimised through the forward stroke and return stroke of the double-stroke piston (DHK).

DESCRIPTION OF THE FIGURES

The invention and its advantageous embodiments and designs are described below with reference to the drawings. They show.

Figure 1:
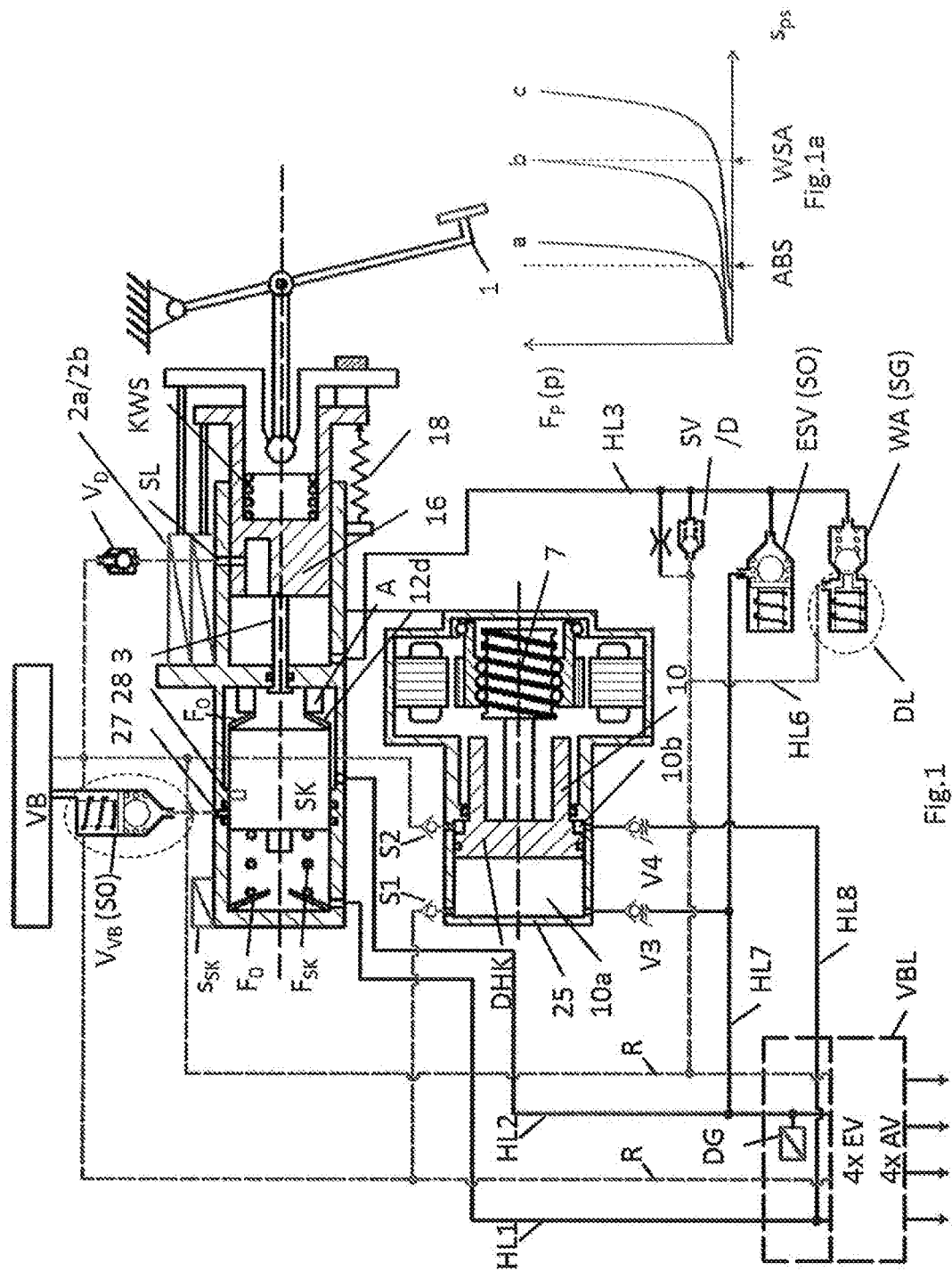
FIG. 1 A system without inlet/outlet valves EA with a simplified path simulator device FIG. 1a Characteristics of the path simulator device FIG. 2 A system with a solenoid valve $V_F$ for pre-filling, alternatively with path simulator according to FIG. 7 of the applicant's document DE 10 2014 109 628.8

With respect to basic construction, the system shown in FIG. 1 has numerous similarities with FIG. 7 of the applicant's document DE 10 2014 109 628.8, so this is only briefly described herein. A first pressure source in the form of a piston-cylinder unit (master cylinder), a second pressure source or piston-cylinder unit with double-stroke piston (DHK), and a third pressure source or piston-cylinder unit with auxiliary pistons 16 are provided. The actuating device, in particular brake pedal 1, acts on the auxiliary piston 16 via a force-displacement sensor KWS (described in more detail below) with two pedal path sensors 2a, 2b. The movement of the auxiliary piston can be transferred to the piston SK of the first piston-cylinder unit (master cylinder) by means of a pedal tappet 3. The piston DHK of the second piston-cylinder unit is driven by means of an electromechanical drive with motor and ball screw drive KGT. The floating piston SK forms a separate working chamber on both its front side and its rear side, which are each connected via a hydraulic line HL1 or HL2 to a valve device or a valve block VBL. The double-stroke piston DHK of the second piston cylinder unit also forms two separate working chambers 10a and 10b, in which the piston has different piston active surfaces and in which the working chambers are connected to the hydraulic lines HL1 and HL2 via hydraulic line sections HL7 and HL8. Hydraulic lines (shown as dashed lines) lead into the non-return valves S1 and S2 from the working chambers 10a, 10b of the double-stroke piston; reservoirs VB are also connected. Non-return valves V3 and V4 are also arranged in the line sections HL7 and HL8. No other valves apart from these are planned in the brake circuit of the embodiment shown in FIG. 8 ahead of the valve block VBL. This forms brake circuits that are separated by the piston SK, but can hydraulically interact in two circuits by displacing the piston SK and its associated volume. A hydraulic line HL3 leads from a working chamber of auxiliary piston 16 to the hydraulic line or brake circuit HL2 via a valve ESV which is open without a current. Another hydraulic line HL6, connected to a normally closed valve WA, leads from line HL3 to a hydraulic return line R, which leads to a reservoir VB. A required electronic control and regulation unit (ECU) for the motor and the other electrical components is not shown.

For the version according to FIG. 1, the pressure build-up during braking goes directly into brake circuit HL2 from working chamber 10a of the second piston-cylinder unit (double-stroke piston DHK) via the valve V3, and into brake circuit HL1 via the working chamber of the piston SK of the first piston-cylinder unit (master cylinder). The valve ESV is closed and the valve WA is open, depending on the operating range of the path simulator WS.

If the volume or the correspondingly reached pressure is insufficient, then volume is transferred into the brake circuit HL1 during the return stroke of the double-stroke piston. This in turn moves the floating piston SK to the right, so that a further pressure increase occurs in brake circuit HL2. In this case, the floating piston SK is moved into the initial position if possible, by opening the brake circuit HL2 via an AV valve for volume compensation in the R line. The position of the floating piston SK is measured by a sensor $S_{SV}$ with target 28. This has an advantage for fall-back level in the case of failure of the DHK or motor. The initial position allows more volumes to be delivered by the floating piston SK than the end position. The same can be done with μ-jump at a low level, reducing pressure in the wheel circles. After the first pressure reduction in the following, this moves the piston into a favourable position through the return stroke, ideally as a function of the position of auxiliary piston 16. When the floating piston SK hits the stop in the initial position (right), the valve $V_{VB}$ and thus the return flow is closed beforehand. It is also closed when the primary or secondary seal of piston SK fails. This is before recognised by the diagnosis circuit if the relation of pressure and delivery volume of the double-stroke piston DHK does not correspond to the pressure-volume curve of the braking system.

The floating piston SK runs into springs $F_D$ in both end positions before the stop. This has the advantage that the ball-screw drive KGT is not as heavily loaded by the stop A, and the stop can be measured through the current increase according to the spring force $F_O$.

The path simulator device WS differs significantly from that in the applicant's document DE 10 2014 109 628.8.

After valve WA is closes, auxiliary piston 16 delivers a corresponding volume into the piston of the path simulator. The spring provides a counterforce that creates a pressure. This pressure then acts on the auxiliary piston and thus also the pedal force. When the valve WA is open in a first stage of the path simulator, the pedal reaction is generated by return spring 18. In the greatly simplified path simulator device according to the invention, the pedal reaction to the main part is generated by the pressure force of pedal tappet 3, which is influenced by the brake pressure. In a WS system, this is a function of the pedal stroke $S_{PS}$, measured by the pedal path sensors 2a, 2b and regulated by the stroke of the double-stroke piston (DHK) or pressure transmitter DG. In other words, in the case of the path simulator device according to the invention, the pressure generated by means of the motor and the double-stroke piston DHK is determined by means of pedal path sensors 2a/2b. This pressure affects pressure chamber 12a. The pressure thus also affects the piston surface of pedal tappet 3, and produces the desired pressure-proportional reaction on the brake pedal.

In the auxiliary piston 16 a strong spring is arranged between the auxiliary piston 16 and a secondary piston to the pedal. When the pedal is actuated, a force-dependent differential movement is produced here, which is measured via the two pedal path sensors 2a/2b. This arrangement is therefore referred to as a force-displacement sensor KWS and is used in particular for error diagnosis.

The set-up of piston stroke and active surfaces=volume for pressure build-up in the braking system can be varied here to optimise the EC motor of the drive, which is expediently realised by a reduction of the motor torque at a higher speed. A reducing gear is often used for this purpose. However, advantageously, a corresponding piston active surface with a corresponding stroke can be used without a gear mechanism.

FIG. 1a shows the characteristic curves in which the pedal force $F_P$ is predominantly pressure-proportional. The characteristic curves can be designed adaptively. The normal characteristic curve corresponds to b, in which a hard stop occurs at the control point of the WS to 40% of the pedal stroke WSA. The maximum pressure is determined here. This control point can be submitted according to characteristic curve a, which is relevant at high pedal speeds, for example. The smaller distance allows pressure to increase to maximum value faster. In contrast, fading can be signalled to the driver, like today, by a longer pedal path corresponding to characteristic curve c. With the ABS function, especially at low μ, the pedal path can be limited, like today, which manifests itself in a hard, pulsating pedal. Thus, closing valve WA can cause the pedal to become stiff. In this case, small pedal movement can still be generated by causing the brake pressure to act on the auxiliary piston by briefly opening valve ESV, and, after closing it, briefly opening valve WA. This results in a pedal movement similar to today's ABS, which can only be effective at the beginning of the ABS function.

This path simulator concept is disadvantageous at high recuperation power/torque of the generator, since the brake pressure is correspondingly smaller and thus also the pedal force. The distance simulator concept from FIG. 7 and FIG. 9 of the applicant's document DE 10 2014 109 384.4 can be used with a hydraulic path simulator piston.

There are numerous brake actuation circumstances to consider. In normal circumstances, brake pedal 1 is returned to the initial position after braking. In this case, the double-stroke piston DHK is also moved back into its initial position. In cadence braking, the brake pressure is reduced and increased again. There are different switching possibilities for the double-stroke piston: a) during pressure reduction, the double-stroke piston DHK moves back into the position determined by the pedal displacement or braking pressure in accordance with the pressure-volume characteristic curve. The return stroke volume enters hydraulic lines HL8 and HL1 for pressure reduction via valve AV; B) the DHK double-stroke piston remains in its position during pressure reduction. The next pressure build-up occurs via the forward stroke or the return stroke with corresponding valve circuit, return stroke with open valve $V_F$ and forward stroke with closed valve $V_F$ if necessary. At the end of braking, the double-stroke piston DHK is moved into its initial position; c) as a) During return stroke into the position determined by the brake pressure, the volume of the return stroke is directed into the return line R, line HL6 to the reservoir VB via an additional solenoid valve (not shown). The additional solenoid valve is connected in the line between the double-stroke piston and valve V4.

In contrast to FIG. 7 of the applicant's document DE 10 2014 109 384.4, the fall-back levels work differently, since, for example, failure of the piston or of the spring of the path simulator WS does not apply.

If, for example, the seal of the auxiliary piston 16 fails or valve WA leaks, this has no effect on the normal brake. Therefore, tightness must be checked in a diagnosis. This occurs at pressure reduction in which the valves ESV and WA are closed at a low pressure level and the pressure transmitter detects a leak. A test that takes a small amount of time will not be noticed by the driver. However, in longer periods of time, a pre-drive check can be carried out, in which the double-stroke piston DHK generates the according pressure. All components can be tested for leaks during a pre-drive check.

In the fall-back level, e.g. engine failure during ABS control, the displaced volume from the working chamber of auxiliary piston 16 moves via valves ESV and EA into the brake circuits HL1 and HL2, which can result in an unbalanced pressure build-up depending on the position of the piston SK. This can be reduced by pressure compensation with the described positioning of the SK piston. Positioning the pistons is unnecessary in the case of engine failure in braking without ABS or before braking.

In the fall-back level 3, the volume from the working chamber of the auxiliary piston 16 acts fully on brake circuit HL2 and the volume from the working chamber of the floating piston corresponding to brake circuit HL1. The auxiliary piston 16 acts like a pressure rod piston DK in this instance. The fed-in volume of auxiliary piston 16 is not subjected to any additional loss volume in this path simulator without a path simulator piston.

Valve $V_{VB}$ corresponds to the function described in FIG. 7 of the applicant's document DE 10 2014 109 384.4, but can be expanded. If the floating piston SK is moved to the right stop on return stroke, pressure can be relieved by opening valve $V_{VB}$, which can be helpful in special cases. In this position, the valve can also be tested for leaks.

Without braking, brake circuit HL2 is closed. Two solutions are shown for pressure compensation. One is a combination of suction valve SV and throttle D. The suction valve SV causes a back-flow of volume into the working chamber of the auxiliary piston when the piston is running in reverse.

An alternative expansion port SL on the auxiliary piston and valve $V_O$ has the same effect.

When the circuit is closed, pressure compensation is necessary when the vehicle is parked and temperatures are rising. Either a suction-valve-throttle combination is planned for this purpose, or a flow control valve in the case of auxiliary pistons with an expansion port, which closes when the auxiliary piston is pressurised.

The throttle D affects the pressure compensation with a relatively small cross-sectional area corresponding to the small temperature rise gradient. On the one hand, this small cross-sectional area enables sufficient sealing of the auxiliary piston circuit HL3 in the described function.

Valve block $V_{BL}$ contains the control valves inlet valves EV for pressure build-up and outlet valves AV for pressure reduction, which are also used for normal braking.

The valves are shown and described in the basic structure in FIG. 1. SO stands for normally open and SG for normally closed. In the case of two valves, the magnetic part is not pressurised, see dashed line. This part is connected to the reservoir and can be manufactured cost-effectively.

Figure 2:
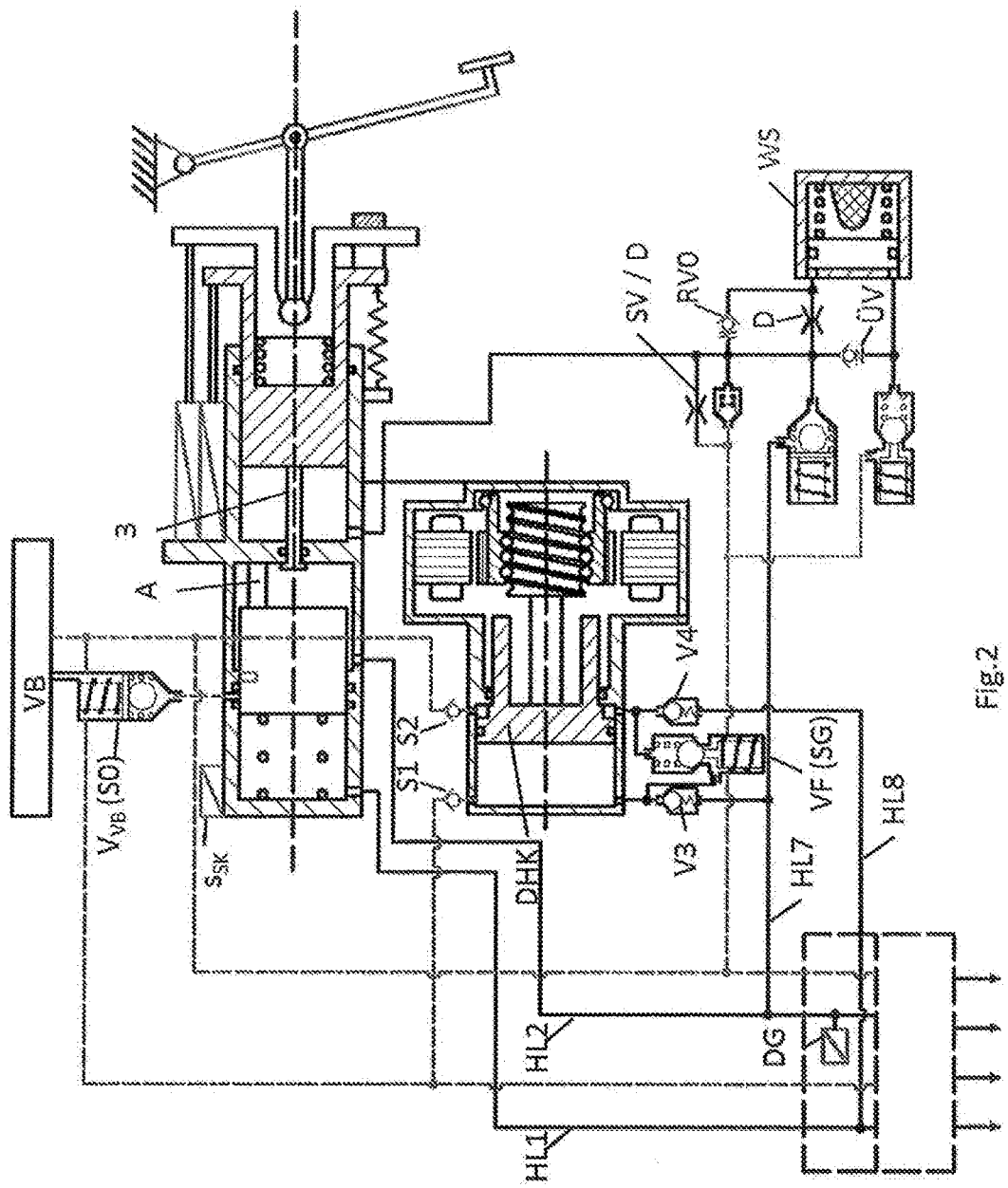
Figures 3, 3A:
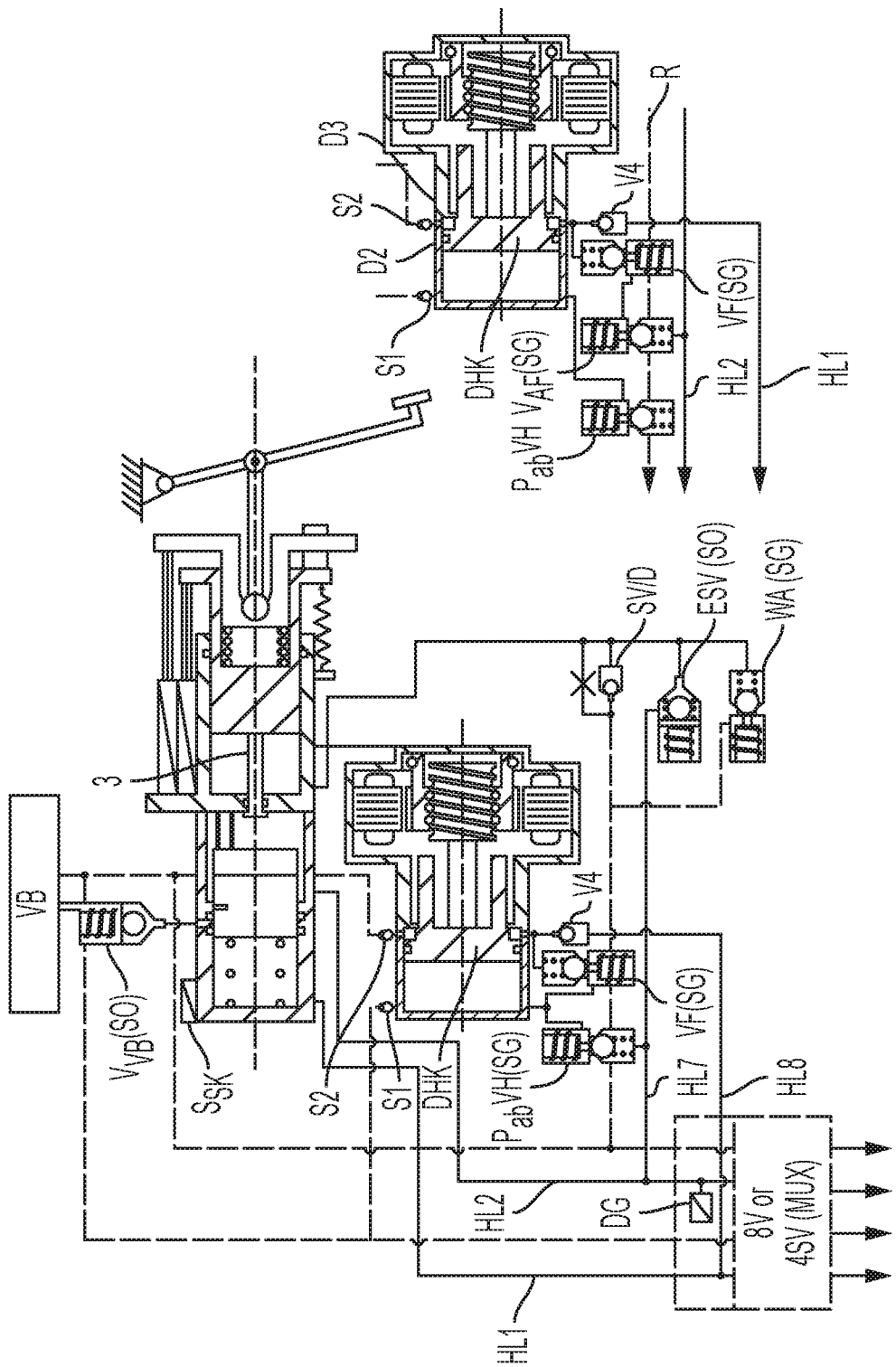
FIG. 3 A system with a valve $D_{ab}$-VH, in which a pressure reduction occurs with the double-stroke piston DHK in the forward stroke FIG. 3a A system according to FIG. 3 with an application for autonomous driving FIG. 3b A system with an alternative configuration to that shown in FIG. 3.
Figure 4:
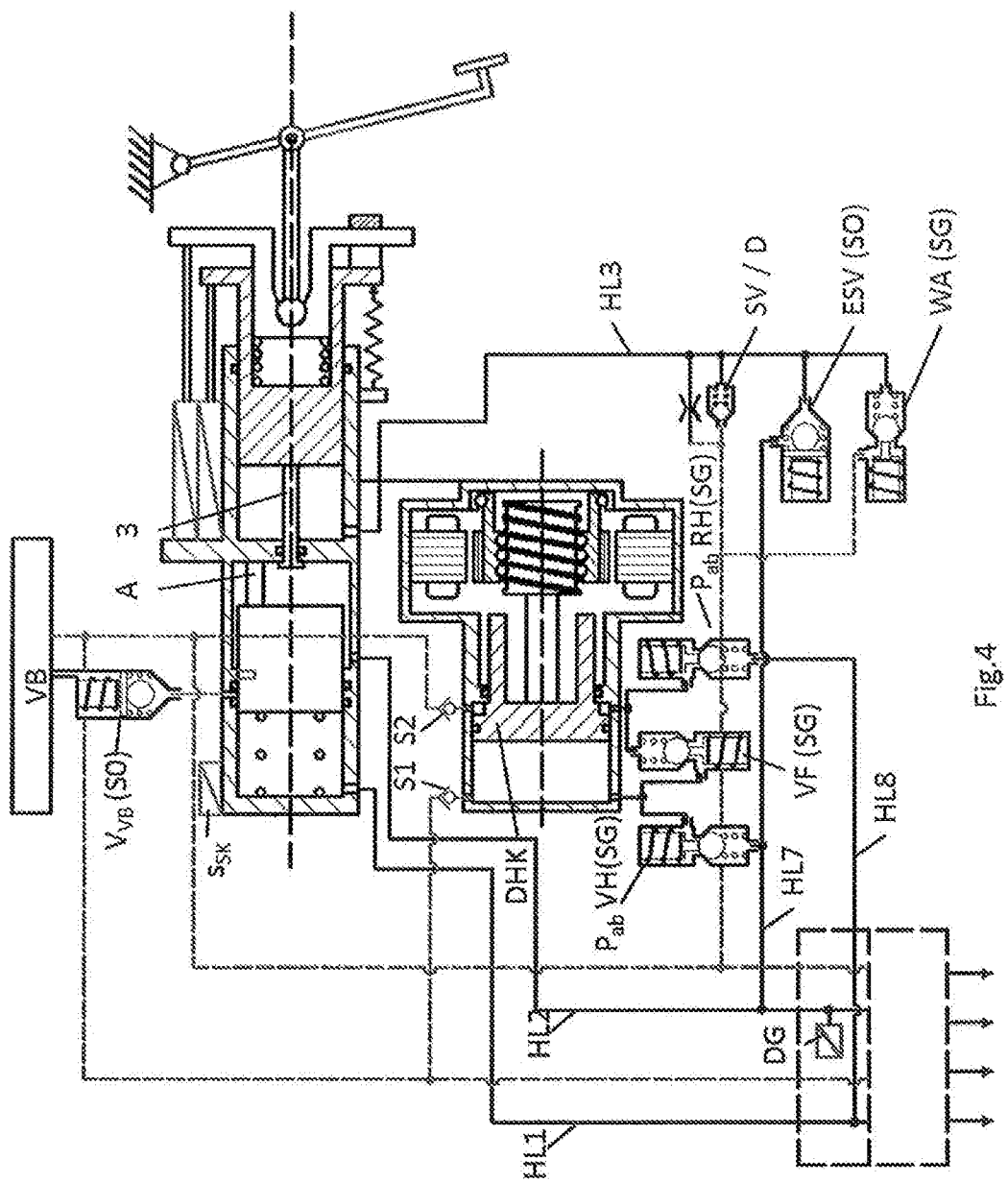
FIG. 4 A system in which the pressure reduction occurs with the double-stroke piston DHK both during the forward stroke and the return stroke.

FIGS. 2 to 4 show embodiments or variations of the system shown in FIG. 1. Therefore, with respect to FIGS. 2 to 4, only the differences in design and mode of operation are described below.

FIG. 2 shows an expansion stage with a magnetic valve VF compared to a permanently adjusted pressure relief valve from FIG. 7 of the applicant's document DE 10 2014 109 384.4.

In FIG. 7 of DE 10 2014 109 628.8, pre-filling of the brake circuit is described by means of a pressure relief valve with a fixed setting. This can be improved by a normally closed solenoid valve VF, which allows variable pre-filling and also allows the volume of the return stroke to be fed into the brake circuit 2. The solenoid valve VF (and, if applicable, other valves shown in FIG. 3a) is/are connected to a hydraulic line connecting the two working chambers 10a, 10b of the double-stroke piston DHK ahead of the non-return valves V3 and V4. For safety reasons, the valve's closing spring is set at the blocking pressure, e.g. 100 bar, so that if brake circuit 2 fails, no volume from brake circuit 1 can pass.

A dormant fault is avoided since tightness is recorded from comparing DHK stroke and pressure change in the brake circuit for each incident function. Even in the case of a double failure of brake circuit 2 and valve VF, valve V3 acts as a barrier to brake circuit 1 in fall-back level. FIG. 2 shows the path simulator of FIG. 7 from the applicant's document DE 10 2014 109 384.4 (E138a), which covers the functions of a likewise adaptive path simulator WS during heavy recuperation.

For reasons of the aforementioned reliability, it is also very expedient that the connection line is connected to the two pressure chambers of the double-stroke piston DHK by a pressure relief valve or a solenoid valve ahead of the non-return valves. During pre-filling, this connection is separated by the pressure relief valve or the solenoid valve VF. This affects the large piston surface of the double-stroke piston DHK. It is important that, in this phase, the piston rear side of the double-stroke piston can be suctioned from the reservoir VB by means of a corresponding valve circuit, only valve S2 in the example. Due to the large piston surface, which delivers a lot of volume, the pre-filling pressure is limited to less than 50 bar so that the piston force is not too high. After valve VF is opened, only the smaller of the active surfaces respective to the smaller piston diameter of the double-stroke piston DHK is effective for the remaining forward stroke (up to the stop=residual stroke). This is then also effective in the highest pressure range, if another forward stroke is necessary. This piston diameter determines the force of the spindle of the ball screw drive KGT and also the torque of the drive motor. The corresponding total stroke with the corresponding active surfaces determines the sufficient volume delivered in the forward stroke for a vehicle's blocking pressure, depending on the specifications of the vehicle manufacturer. For the return stroke, the smaller differential surface of the active surfaces acts with corresponding pressure-proportional piston force. This means that, during the return stroke or in the case of high volume requirements, maximum pressure can be achieved with an additional forward stroke. Due to the smaller piston surface, this results in smaller piston forces and corresponding optimisation of the spindle transmission and/or motor.

FIG. 3 shows an expansion stage with a valve $P_{ab}$-VH, which is open during the forward stroke function and allows both pressure build-up and reduction within the volume and pressure range up to approximately 100 bar, which are possible during forward stroke due to the double-stroke piston DHK. This pressure is sufficient for 95% of all brakes. The return stroke becomes necessary for higher pressures. Pressure reduction then occurs through the valves AV as in FIG. 1.

Figure 3B:
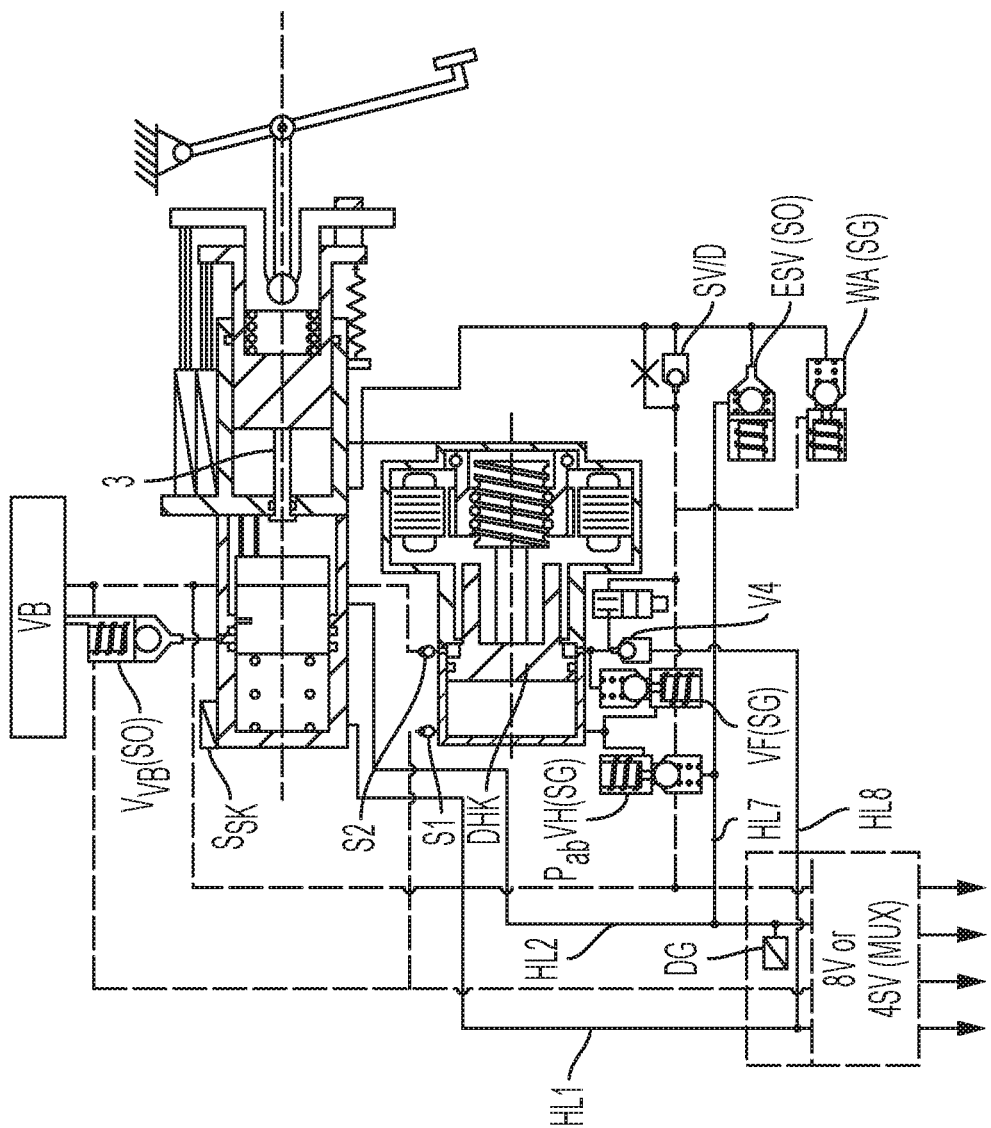

Without pre-filling, pressure is reduced with the double-stroke piston when valve Pab-VH and valve VF are open. Pressure reduction is measured by the pressure transmitter, and the double-stroke piston determines the speed of the pressure reduction, controlled by the pedal path sensors. Pressure reduction with the double-stroke piston (DHK) has the advantage, among others, that the outlet valves AV do not have to be opened, which would be related to opening the brake circuits. If the pressure reduction is carried out with pre-fill volume, the smaller volume of the return stroke is not sufficient to reduce the pressure to 0 bar because of the smaller effective piston surface. Two solutions are possible. The volume, which is determined by the stroke with a larger piston surface and the residual stroke with a smaller piston surface, is known from the forward stroke with valve VF. The stroke position when switching the valve VF is inputed in the control of the double-stroke piston DHK. In the case of pressure reduction, the differential volume that the return stroke can not absorb is determined. This differential volume is then delivered in the first phase via the outlet valve AV, preferably in brake circuit 2, into the return flow to the reservoir. The volume is assigned to a pressure difference from the known pressure-volume curve. In a second phase, the pressure is further reduced to pressure 0 via the double-stroke piston DHK. An advantage of this sequence is the opportunity to diagnose the valve AV. Should a leak occur, this can be seen from the pressure drop and the stroke movement of the double-stroke piston. The second solution shown in FIG. 3b is that an outlet valve AV is used for the return flow in parallel to valve V4. This is opened for pressure reduction during the return movement of the double-stroke piston DHK, wherein the valve VF is closed.

Multiplex (MUX) mode is also possible with this valve. Here, the pressure rod piston is replaced by the DHK in the serial design. It is also conceivable to use partial MUX operation only for pressure build-up, and in special cases also for pressure reduction. Advantages of the MUX in the precise pressure control through the DHK's corresponding volume measurement are also feasible in a modular expansion stage.

Reference is now made to FIG. 3a. The system requires redundant components for autonomous driving. A redundant winding with control can be used for an EC motor, for example. If seal D2 fails, pre-filling no longer works. The piston with D3 still allows volume delivery and thus pressure build-up. If suction valve S1 fails, forward stroke is not possible, only return stroke in brake circuit HL1, without pressure build-up in HL2. This can be solved by means of an additional VAF (S6), which also feeds volume into HL2 during the return stroke in addition to HL1. If HL1 fails, $V_{AF}$ acts redundant to VF, blocking the volume flow into the failed HL1.

Thus, with little effort, there is also an application for autonomous driving.

FIG. 4 shows the expansion stage with $D_{ab}$ valves for both the forward stroke and the return stroke. This makes a pressure reduction in the DHK possible, even during the return stroke.

Thus, MUX is still possible in the forward and return stroke. Furthermore, when all valves are open, it is possible to connect both brake circuits and thus allow pressure compensation during braking and ABS control.

With these valve circuits, all functions currently in-demand can be implemented with minimal effort and a high level of reliability.

REFERENCE LIST

1 Brake pedal
2a Pedal path sensors master
2b Pedal path sensors slave
3 Pedal tappet
7 Spindle (KGT)
8 EC motor
10 Double-stroke piston (DHK)
10a Pressure chamber or working chamber
10b Pressure chamber or working chamber
12 SK piston
12d Pressure chamber or working chamber on floating piston SK (rear side)
16 Auxiliary piston
18 Pedal return spring
25 DHK housing
27 Expansion port
28 Stop
A Stop
D Frame for throttling
S1 Non-return valve or suction valve
S2 Non-return valve or suction valve
V3 Non-return valve or pressure relief valve
V4 Non-return valve or pressure relief valve
VVB (normally open) solenoid valve
R Return flow to reservoir
KWS Force displacement sensor
WA (normally closed) solenoid valve
HL1 Hydraulic line or brake circuit section
HL2 Hydraulic line or brake circuit section
HL3 Hydraulic line
HL6 Hydraulic line
HL7 Hydraulic line or brake circuit section
HL8 Hydraulic line or brake circuit section
ESV (normally open) solenoid valve
BK Brake circuit
DG Pressure transmitter
VF (normally closed) solenoid valve
VAF (normally closed) solenoid valve
VB Reservoir
VBL Valve block
VD Pressure compensation valve
$F_{SK}$ Return spring SK
Pab-VH (normally closed) solenoid valve
Pab-RH (normally closed) solenoid valve AV Outlet valve ABS
EV Inlet valve ABS
Fo Spring on piston DK
FSK Spring on piston DK
VVB (normally open) valve to reservoir VB
R Return line to reservoir

The invention claimed is:
1. An actuation system for a vehicle brake, including: an actuating device,
   at least one first pressure source, comprising a first piston-cylinder unit, which is arranged to be actuated by means of the actuating device, and
   a second pressure source, comprising a second piston-cylinder unit, including two working chambers separated by a piston of the second piston-cylinder unit and an electro-mechanical drive,
   wherein the first and second pressure sources are each connected to at least one brake circuit via a hydraulic line, in order to supply the brake circuit with pressurising medium and to pressurise the vehicle brake,
   and further including a valve device arranged to regulate brake pressure,
   wherein during forward and return strokes of the second piston-cylinder unit, at least one brake circuit is enabled to be fed controlled pressurising medium for pressure build-up by way of the second piston cylinder unit, and
   wherein either the forward stroke and return stroke or the respective working chambers of the second piston-cylinder unit are each assigned to one respective brake circuit for a two-circuit pressure supply.

2. The actuation system according to claim 1, wherein respective brake circuits are each connected to a working chamber of the first piston-cylinder unit, without intermediary separating valves, and are separated from one another using a piston of an additional piston-cylinder unit.

3. The actuation system according to claim 1, wherein a first brake circuit is connected to a working chamber on a front side of the first pressure source, and a rear side of the second piston-cylinder unit, and/or wherein a second brake circuit is connected to a working chamber on a front side of the second piston-cylinder unit and a rear side of the first pressure source.

4. The actuation system according to claim 1, further including a solenoid valve arranged for variable pre-filling of a brake circuit.

5. The actuation system according to claim 4, further including a closing spring of the solenoid valve, wherein the closing spring is designed for a blocking pressure of the vehicle brake.

6. The actuation system according to claim 1, further including a pressure reduction valve associated with the second piston-cylinder unit, wherein the pressure reduction valve is open during the forward stroke of a piston of the second piston-cylinder unit.

7. The actuation system according to claim 1, further including a pressure reduction valve associated with the second piston-cylinder unit, wherein the pressure reduction valve is open during the return stroke of a piston of the second piston cylinder unit.

8. The actuation system according to claim 1, wherein a multiplex mode occurs by means of a valve circuit.

9. The actuation system according to claim 8, wherein the actuation system for multiplex mode has at least one pressure reduction valve associated with the second piston-cylinder unit.

10. The actuation system according to claim 8, wherein the actuation system for multiplex mode comprises a magnetic valve arranged in a hydraulic line between the first pressure source and a reservoir.

11. The actuation system according to claim 1, wherein the second piston-cylinder unit is used for diagnostic purposes.

12. The actuation system according to claim 11, characterised in that a suction-valve-throttle combination is arranged for pressure compensation of a third pressure source, comprising piston-cylinder unit having an auxiliary piston, or of a flow control valve in the case of an auxiliary piston with an expansion port.

13. The actuation system according to claim 1, further including a magnetic valve associated with the second piston-cylinder unit and arranged to feed volume into at least one brake circuit during the return stroke of a piston of the second piston-cylinder unit.

14. The actuation system according to claim 1, further including at least one sensor arranged for controlling the position of or diagnosing a piston of the first piston-cylinder unit.

15. The actuation system according to claim 1, further including a path simulator device, without a path simulator piston, and arranged such that a pressure-proportional restoring force acts on the brake pedal, via a tappet.

16. The actuation system according to claim 1, wherein different effective piston surfaces are enabled to be switched on by means of a corresponding valve circuit during forward stroke and return stroke of the second piston-cylinder unit with and without pre-filling.

17. The actuation system according to claim 16, wherein greatly different large and small effective piston surfaces are used in forward stroke with and without pre-filling and return stroke for volume delivery with the piston of the second piston-cylinder unit, wherein the large effective piston surface is used for pre-filling, and wherein the effective piston surfaces can be switched over at least during the forward stroke.

18. The actuation system according to claim 16, wherein the piston surfaces of the double-stroke piston and strokes of the pre-filling and residual stroke are selected in such a way that a volume corresponding to a blocking pressure is achieved during the forward stroke.

19. The actuation system according to claim 1, further including a solenoid valve arranged in a hydraulic line from one working chamber of the first pressure source to a reservoir, wherein the solenoid valve is configured to cut off a return line to the reservoir when a floating piston is on stop or a seal of the floating piston fails.

20. The actuation system according to claim 1, wherein pressure build-up and pressure reduction control occurs via the double-stroke piston via pressure volume control.

21. The actuation system according to claim 1, wherein, per wheel brake, either an inlet valve and an outlet valve or only one valve is disposed, wherein either at least one of the inlet and outlet valves or the only one valve is opened for pressure build-up and pressure reduction in a respective wheel brake.

22. A method for operating the actuation system according to claim 1, the method including:
   changing a pressure in at least one brake circuit by means of a double-stroke piston of the second piston-cylinder unit, wherein said changing the pressure is separated in two brake circuits by means of a piston of the first piston-cylinder unit by movement of the double-stroke piston of the second piston-cylinder unit.

23. The method according to claim 22, further including:
supplying pressure medium to a first brake circuit during a forward stroke of the double-stroke piston of the second piston-cylinder unit for pressure build-up, and also supplying pressure medium to another brake circuit via the piston of the first piston-cylinder unit, supplying pressure medium to the another brake circuit on the return stroke, and also supplying pressure medium to the first brake circuit via the piston of the first piston-cylinder unit;

and/or reducing pressure in at least one brake circuit or at least one wheel brake by means of the second piston-cylinder unit, either only during the forward stroke or during both the forward stroke and return stroke of the double-stroke piston of the second piston-cylinder unit.

24. The method according to claim 23, further including connecting a circuit of the forward or return stroke to a different brake circuit when the double-stroke piston is being fed in the forward stroke or return stroke and an active brake circuit fails due to a leak.

25. The actuation system according to claim 4, further including at least one other valve for additional functions and assigned to the second piston-cylinder unit, wherein the at least one other valve is arranged between two working chambers of the second piston-cylinder unit in a connecting line arranged ahead of non-return valves.

26. The actuation system according to claim 1, wherein, by means of the second piston-cylinder unit, there is pressure reduction in at least one brake circuit, either only in the forward stroke or in both the forward stroke and the return stroke.

* * * * *